United States Patent [19]
Ware et al.

[11] 3,932,015
[45] Jan. 13, 1976

[54] SUPPORT MEANS FOR AN ELECTRICALLY OPERATED TOOL

[75] Inventors: Peter George Ware, Rugby; George Kenneth Mercer, Bedworth, both of England

[73] Assignee: Dunlop Limited, London, England

[22] Filed: Sept. 23, 1974

[21] Appl. No.: 508,618

[30] Foreign Application Priority Data
Sept. 27, 1973 United Kingdom............... 45261/73

[52] U.S. Cl. ..................... 339/58; 339/147; 30/216
[51] Int. Cl.² ................... H01R 11/02; B26B 19/02
[58] Field of Search ........ 339/58, 147; 30/215, 216, 30/275

[56] References Cited
UNITED STATES PATENTS

| 1,217,534 | 2/1917 | Trood | 339/58 X |
| 2,299,468 | 10/1942 | Dafforn et al. | 339/58 X |
| 2,668,888 | 2/1954 | Johnson | 339/147 P X |
| 2,745,938 | 5/1956 | Brandler | 339/58 X |
| 3,579,827 | 5/1971 | Grahn | 30/216 X |
| 3,623,223 | 11/1971 | Edgell et al. | 30/216 X |
| 3,759,020 | 9/1973 | Simmons | 30/276 X |

Primary Examiner—Joseph H. McGlynn
Assistant Examiner—Craig R. Feinberg
Attorney, Agent, or Firm—Stevens, Davis, Miller & Mosher

[57] ABSTRACT

A handle for an electrically-operated hand-held tool such as a hedge trimmer is formed with a body having similar terminals at its opposite axial ends. The handle body can make a plug-and-socket connection with the tool housing in any chosen one of a number of different positions angularly rotated or inverted relative to one another, terminals on the body and housing making contact in any of these positions. In this way the attitude of the handle relative to the tool can be varied without losing the electrical connection. In a modification the body is integral with one end of the pivotable extension adapted to carry a handle at its other end.

8 Claims, 7 Drawing Figures

SUPPORT MEANS FOR AN ELECTRICALLY OPERATED TOOL

The present invention relates to support means, such as a handle, for an electrically operated tool, such as a hedge trimmer incorporating an electric motor.

In accordance with one aspect of the invention there is provided support means for an electrically operated tool which support means includes a tool engaging body adapted to be detachably assembled with the tool in any chosen one of a plurality of different attitudes relative to the tool in each of which attitudes terminal means on the body will form an electrical circuit for energizing the tool with terminal means on the tool.

The tool engaging body may be an integral part of a handle constituting the support means whereby the handle may be assembled with the tool to extend therefrom in any one of a plurality of different, optionally selectable attitudes. Alternatively the body may be pivotably or otherwise connected to an extension member which may be adapted, at its end remote from the body for electrical connection to a second, similar body, which latter may constitute an integral part of a handle.

In a preferred construction the terminal means is constituted by terminal elements which extend through the body and are exposed therefrom at their opposite ends at opposite faces of the body, each said element being adapted for electrical connection to a respective wire intermediate the exposed ends of the element. In this construction the body is formed with a bore opening at both said faces thereof, the axis of the bore being parallel with the axes of the terminal elements so that the relationship of the bore to the terminal elements is the same at both said faces of the body. The bore is adapted to receive a spigot on the tool which has the same relationship to the terminals of the tool as does the bore to the body terminals. By this arrangement either end of the bore can receive the spigot, electrical connection being made between the tool terminals and the ends of the support terminals which are nearer the tool.

By providing the tool and body with an equal number of terminals on each side of the spigot or bore, equidistant therefrom and arranged in the same plane containing the axis thereof it is possible to connect the body to the tool, in either of its two mutually inverted positions in either of two positions rotated 180° relative to one another. In this way it is possible to connect the body to the tool in any chosen one of four different attitudes in all of which electrical connection to the tool terminals is provided by the same, single set of terminals on the support means.

In accordance with another aspect of the invention there is provided the assembly of an electrically operated tool and support means therefor, wherein the support means is formed on opposite sides thereof with similar connection means either of which may take a male-and-female releasable connection with connection means of the tool whereby the support means is releasably connectable to the tool in either of two mutually inverted positions, terminal means on the tool having a predetermined relationship to the connection means of the tool and terminal means on the support means extending therethrough to have the same relationship to the respective connection means of the support means on each of said opposite sides of the latter, said relationship corresponding to that of the tool terminals to the tool connection means, the arrangement being such that the terminal means of the support means are engageable with the terminal means of the tool in either of said mutually inverted positions of the support means relative to the tool.

The number and the disposition of the terminal means relative to the connection means on both sides of the support means and on the tool is preferably such that in either of its two mutually inverted positions the support means can be releasably connected to the tool in either of two positions rotated 180° relative to one another, the tool terminals each engaging a different support means terminal as a result of the rotation, so as to form a circuit of reversed polarity.

Electrical tools are normally controlled by a central switch incorporated in the handle and spring biassed to the "off" position so that the tool is switched off as soon as a grip on the handle is relieved. This prevents accidents by preventing the tool operating when not held, for example if dropped. However there remains the danger that the tool may be inadvertently switched on when picked up by the handle and to prevent such unintentional operation a safety catch has been provided which must be released before the control switch can be moved to the "on" position. In known constructions, however, this safety catch has been positioned within easy reach of the hand gripping the handle and consequently this hand may accidentally both release the catch and squeeze the control switch, for example when picking up the tool, with consequent danger and removal of the advantage of the safety catch.

In accordance with yet another feature of the present invention there is provided a handle for an electrically operated tool, the handle being formed with grip-defining areas such that the hand has a normal gripping position relative to the handle when the tool is normally held for use by the handle and the handle incorporating a control switch which is positioned on the handle easily to be reached by a hand in the gripping position and a safety catch or switch positioned on the handle not to be easily reached by a hand in the gripping position, the control switch being spring-biassed to its "off" position so as to switch off the tool when released and the safety catch or switch being connected to the control switch in such a way as to render the control switch inoperable when the latter resumes its "off" position until the safety catch or switch has first been operated.

A preferred embodiment of the present invention will now be described as applied to a modification of the hedge trimmer generally as described and claimed in the complete specification of our co-pending British Patent Applications Nos. 7,770/72, 7,771/72 and 50,652/72 (cognate), but it will be understood that the invention is also applicable to any other electrically-operated, hand-held tool with conversion of rotary to reciprocating motion, such as a jig-saw or sander.

Figure 1:
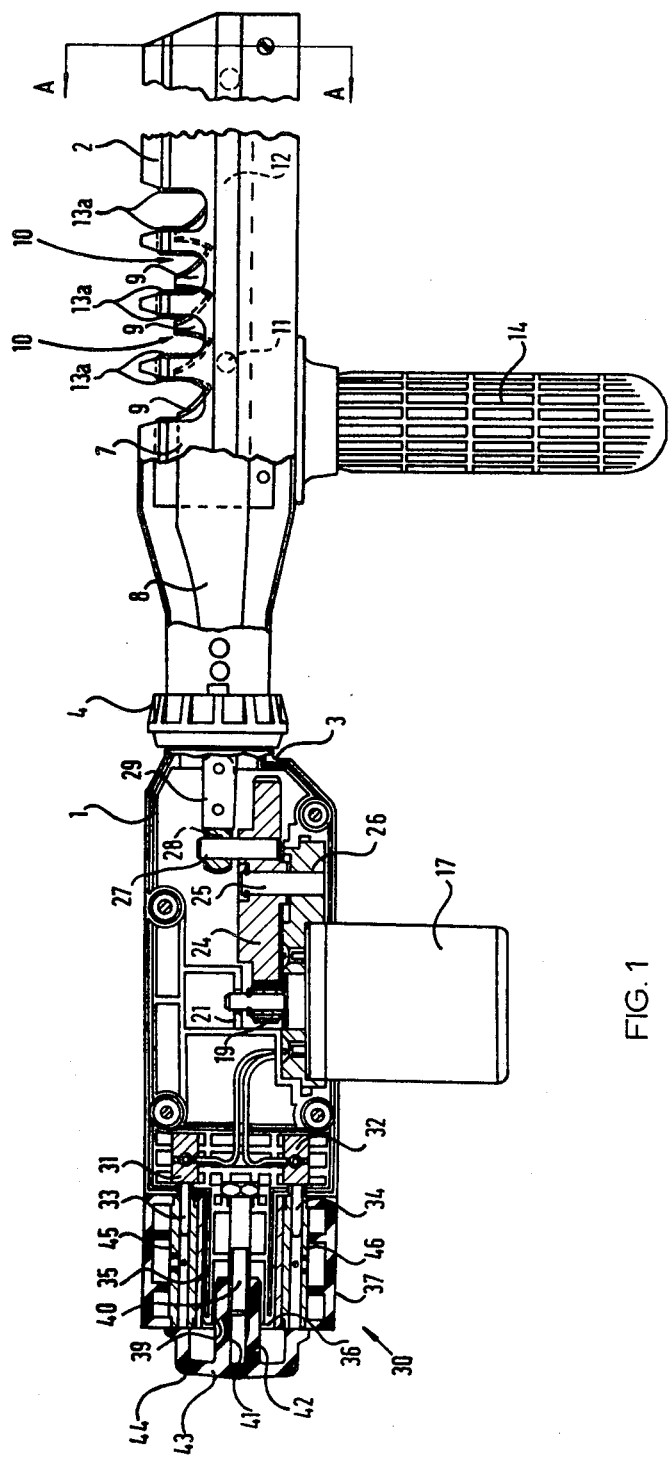
FIGS. 1 and 2 are respectively a side elevation and a plan view of a hedge trimmer and handle assembly in accordance with the present invention, each partly in section.
Figure 2:
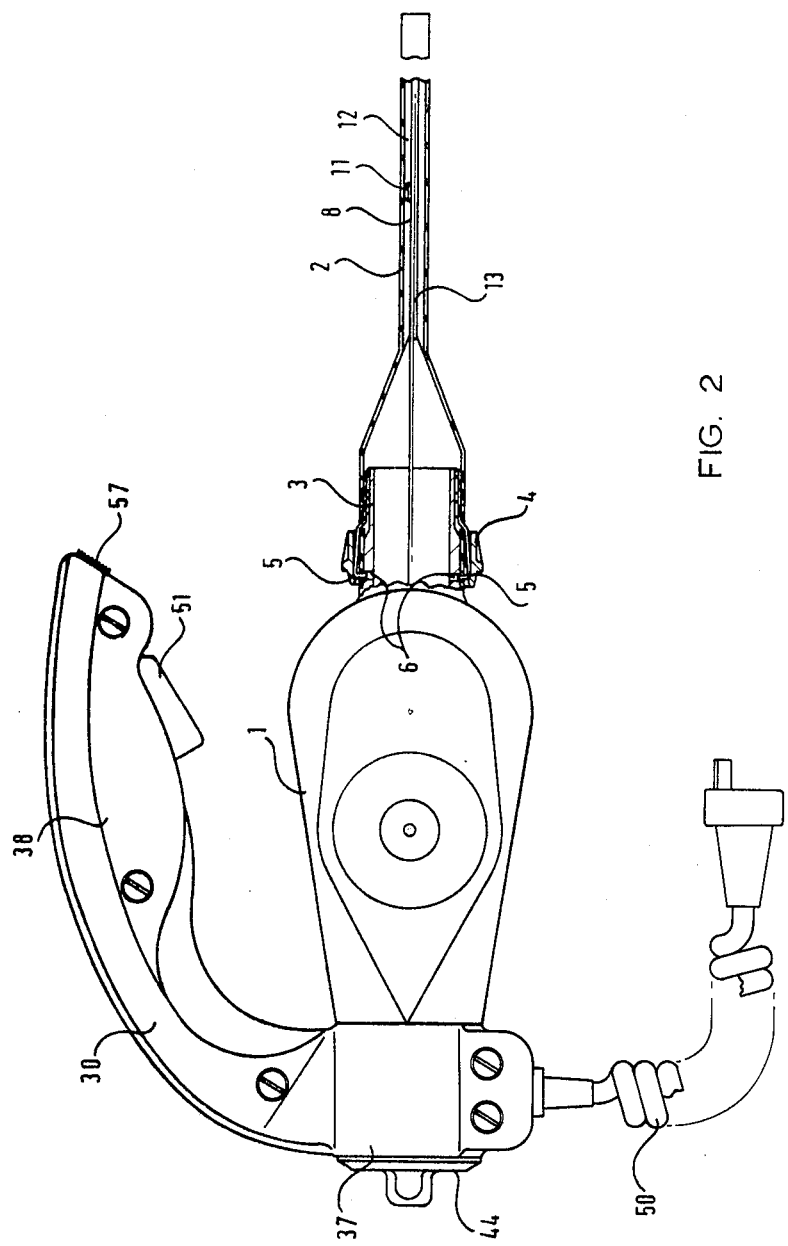

Referring first to FIGS. 1 and 2 there is shown a modification of the hedge trimmer which is described and claimed in the complete specification of our co-pending British Patent Applications Nos. 7,770/72, 7,771/72 and 50,652/72 (cognate) and which comprises a housing 1 on which a comb 2 of flattened tubular form is mounted on a spigot 3 of the housing. The comb is secured to the housing by a collar 4 which drives spring elements 5 into slots 6 in the housing.

The comb 2 is formed from mild steel and has a flattened portion 7 which provides guidance for a thin steel cutting blade 8, having a thickness of one millimeter. The blade is serrated to provide teeth 9 exposed in notches 10 formed along one edge of the flattened portion of the comb 2. The blade is provided on one side with small rounded projections 11 of low friction plastics material fitted into holes in the blade at spaced positions along its length and arranged to slide in a groove 12 formed longitudinally in one side of the comb by a suitable pressing operation. The other side of the blade is supported by a hardened steel ledger plate 13 disposed between the blade and the comb, the ledger plate being provided with teeth 13a which project into the notches formed in the comb. The blade and ledger plate teeth are both chamfered to respectively provide sharp cutting and support edges which co-operate to give the required cutting action.

The housing 1 is provided with a handle 14 secured to the tubular portion of the comb of the housing.

A 12 volt d.c. motor 17 is mounted in a casing extending from the housing. The motor drives a pinion 19 supported within the housing on a bearing 21. Pinion 19 meshes with a crank wheel 24 carried on a low friction bearing 25 mounted on a shaft 26. The crank wheel 24 is provided with a crank pin 27 surrounded by a part-spherical sintered bronze bush 28 to allow for the malalignment, during assembly, of the crank pin and blade guidance system. The portion 29 of the reciprocating cutting blade 8 adjacent the bush 28 is looped around the bush thus connecting the blade and the crank wheel 24.

The portion 29 of the reciprocating cutting blade 8 adjacent the crank pin is of reduced width relative to the remainder of the blade, and is arranged to flex from side to side as the crank pin is rotated, the remaining portion of the blade being held and guided for smooth reciprocating linear movement within the comb.

The flattened portion 7 of the comb and the ledger plate 13 guide the blade against lateral deflection, that is deflection at right angles to the plane of the blade, while the projections 11 on the blade and the longitudinal groove 12 in the comb guide the movement of the blade in its own plane.

In operation, the motor 17 is supplied with power from a battery which may conveniently be carried in a haversack by the person operating the trimmer. When the motor is running, the crank wheel 24 is rotated by pinion 19 and the flexible portion 29 of the blade 8 flexes from side to side as the crank pin rotates in addition to reciprocating back and forth in order to drive the cutting blade.

Figure 1A:
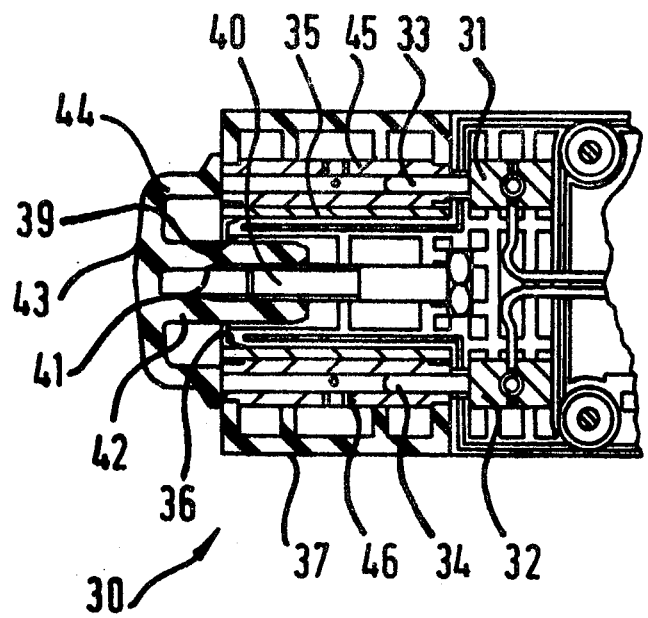
FIG. 1a is an expanded view of part of the handle assembly of FIG. 1.

The circuit for the motor 17 includes two male terminals 31 and 32, respective pins 33 and 34 of which project from the end of the housing 1 remote from the comb 2. A spigot 35 projects axially from this end of the housing 1 between the terminals 31 and 32 and this is received in a bore 36 in an integral body portion 37 of a handle generally indicated at 30, which in addition to the body portion 37 includes a hand grip portion 38 by which it may be grasped to lift and manipulate the hedge trimmer. An expanded view of handle 30 is shown in FIG. 1a. The spigot 35 has a coaxial bore 39 from the inner end of which a threaded spindle 40 extends coaxially through the bore 39. The spindle 40 is received on a threaded bore 41 in a boss 42 of a locking member 43 the domed end 44 of which engages the end of the body 37 remote from the housing 1 to secure the handle on the spigot 35.

Figure 3:
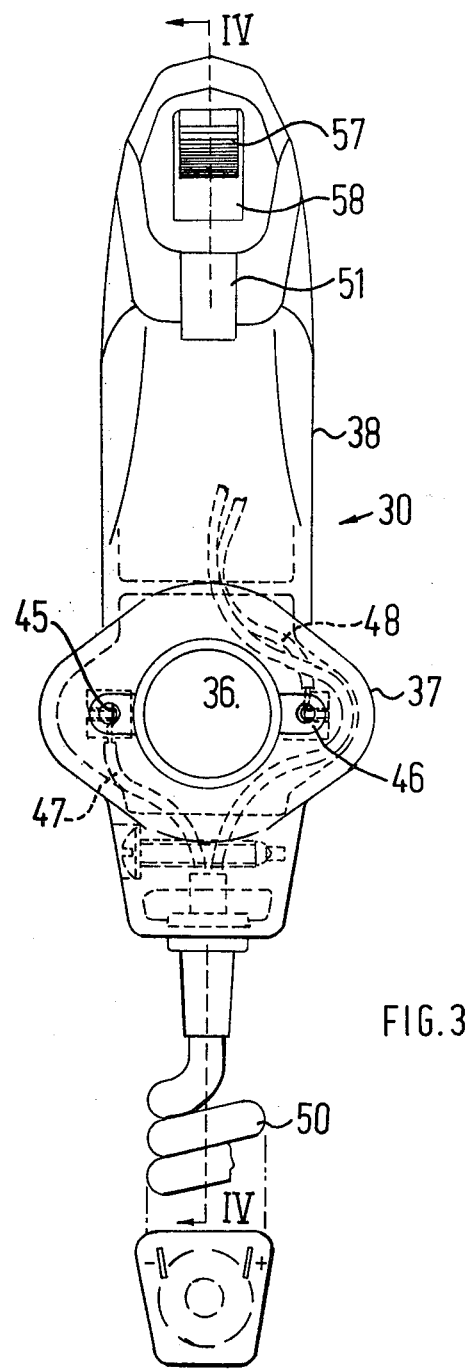
FIG. 3 is an end elevation of the handle of FIGS. 1 and 2 in isolation from the hedge trimmer.

Referring to FIG. 3 it will be seen that the bore 36 is of constant, circular section to receive the circular section spigot 35, but the body 37 is of approximately ovoid configuration and on opposite sides of the bore 36 in the thicker portions of the body 37 female terminals 45 and 46 are located adjacent the bore 36 to receive the pins 33 and 34, respectively. These female terminals take the form of brass tubes each extending from end to end of the body 37 so as to open on opposite sides of the handle and each provided intermediate its ends with a conventional arrangement of bores and grub screws for electrical connection to a respective wire 47 or 48. The wires 47 and 48 are included in the flow or return line of a control switch 49 incorporated in the grip portion 38 of the handle to which current is supplied by a flex 50 from a source (not shown) such as a 12 volt battery carried by the user of the hedge trimmer.

Figure 4:
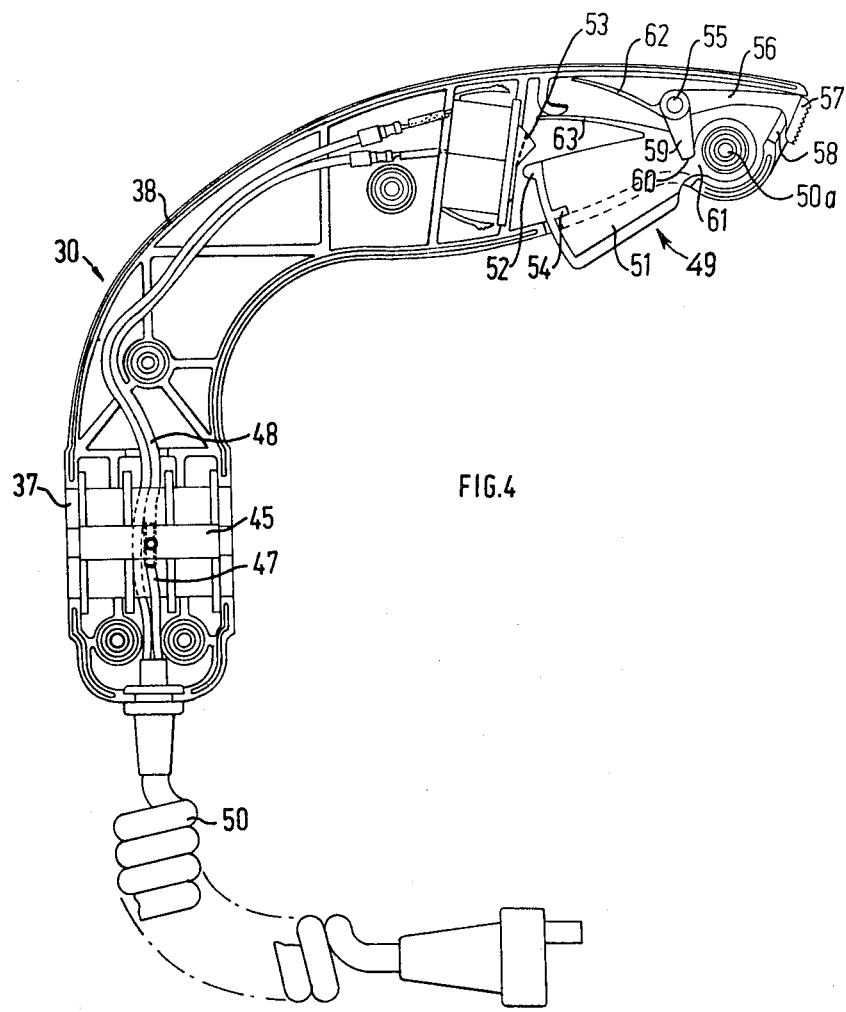
FIG. 4 is a view of the handle taken on the line IV—IV of FIG. 3.

Referring to FIG. 4 there is pivotally mounted at 50a near to the free end of the gripping portion 38 of the handle a switch actuating member 51 having a lug 52 which, as the member 51 rotates about the pivot 50a, is arranged to actuate the rocker element 53 of the control switch 49. The rocker switch is not illustrated in detail as it is well known per se. As is also well known per se, the member 51 is biassed by an integral resilient tongue 63 serving as a cantilever spring to the position illustrated in FIG. 4 wherein an abutment 54 engages the shell of the handle gripping portion and the rocker element 53 of the control switch is in the off position. As may be seen from FIGS. 2, 5 and 6 the gripping portion 38 of the handle is suitably shaped to be gripped by the hand and the member 51 is positioned on the gripping portion 38 easily to be reached by one or more fingers when the hand is in the designed gripping position to enable the user by a squeezing action to move the member 51 against its spring bias inwardly of the shell of the handle gripping portion so that the lug 52 operates the rocker 53 to the "on" position of the switch 49. As soon as the member 51 is released it resumes the position shown in FIG. 4 by spring action, thus actuating the rocker 53 to the "off" position of switch 49. Rotatable about a pivot 55 in the handle gripping portion parallel with and spaced from the pivot 50a is a safety catch element 56 of bell crank configuration. One arm of the element 56 terminates in an end portion 57 which has limited movement in a slot 58 in the free end of the shell of the handle gripping portion 38, its exposed end face being serrated to assist pivotal movement of the catch member 56 by a finger pressing against the exposed end 57. The free end of the other arm 59 of the catch 56 is arranged to abut a step 60 at one end of a cam 61 which projects from one side of the member 51 and is integral therewith. The catch 56 includes an integral cantilever spring 62 which engages the inside of the shell of the handle gripping portion 38 to bias the catch 55 to the position shown in FIG. 4. Therefore before the control member 51 can be moved from the position shown in FIG. 4 the end 57 of the catch 56 must be moved downward in the slot 58 until the free end of the arm 59 clears the step 60. So long as the member 51 is held in the inwardly-displaced position the arm 59 will engage the cam 61, but as soon as the member 51, on release, resumes the position shown in FIG. 4 under the spring action of its resilient tongue 63 the arm 59 is moved into engagement with the step 60 by the tongue 62. By this arrangement the control switch 49 cannot be moved to the "on" position by squeezing the member 51 until the catch 56 is first operated. On release of the member 51 it moves automatically to operate switch 49 to the "off" position and the safety catch 56 is automatically re-engaged.

In accordance with a feature of the present invention the position of the operating portion 57 of the safety catch 56 on the handle 30 is such that it cannot easily be reached by a hand which is holding the handle in the normal, designed gripping position. In this way inadvertent operation of the safety catch, for example when picking up the hedge trimmer, is made considerably less likely than in prior art arrangements wherein both the switch actuating member and the safety catch are easily accessible to the fingers or thumb of a hand in the normal gripping position.

Figure 5:
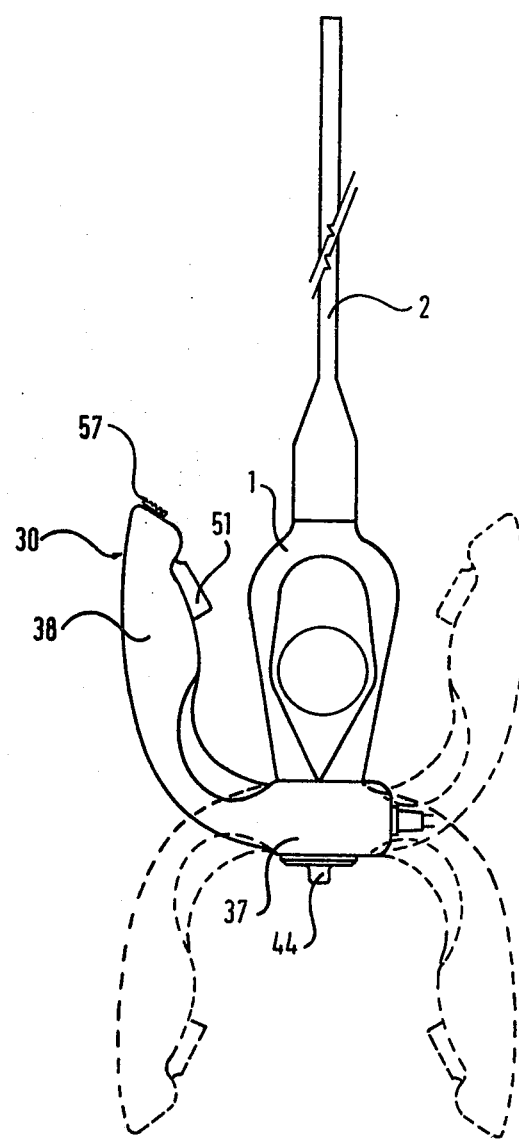
FIG. 5 is a schematic view of the handle and hedge trimmer assembly illustrating the four possible positions of the handle.

It will be clear that the handle assembly 30 is mounted on the hedge trimmer by inserting the spigot 35 of the housing 1 into the bore 36, rotating the handle about the spigot 35 until the female terminals 45 and 46 are aligned with the pins 33 and 34, moving the body portion 37 of the handle axially into abutment with the housing 1 so that the pins are received in the female terminals and finally screwthreading the locking member 44 onto the spindle 40 to prevent displacement of the body 37 away from the housing 1. Reversal of the polarity of the circuit of the motor 17 does not affect the operation of the hedge trimmer and consequently it is optional whether the female terminals 45 and 46 receive the pins 33 and 34, respectively, as illustrated in FIG. 1 or whether the body 37 of the handle is withdrawn along the spigot 35, rotated through 180° and repositioned so that the pin 34 enters the terminal 45 and the pin 33 enters the terminal 46. Similarly, since the female terminals 45 and 46 extend through the body 37 and open at both sides of the handle it is optional whether the body 37 has the position shown in FIG. 1 or whether it is placed in the opposite end-to-end relation with respect to the hedge trimmer, i.e. so that the end of the body 37 remote from the housing 1 in FIG. 1 is brought into abutment with the housing, the end of the body shown as abutting the housing 1 in FIG. 1 now being remote from the housing and being engaged by the member 44. In this axially reversed position it is again optional which of the female terminals receives which of the pins 33 and 34 so that there are a total of four different positions in which the handle 30 can be assembled with the hedge trimmer as illustrated in FIG. 5. As shown, the hand gripping portion 38 of the handle extends first radially with respect to the body portion 37 and then obliquely with respect to the axis of the body portion and consequently the gripping portion 38 can be made to extend either inwardly or outwardly with respect to the hedge trimmer, and whether extending inwardly or outwardly can be positioned on one side or the other of the hedge trimmer adapting it for left-hand or right-hand use.

It will be noted that the member 44, which is of electrically insulating material, is designed not only to prevent axial displacement of the body 37 away from the housing 1 but to extend radially beyond and cover the exposed ends of the female terminals 45 and 46 in the assembled position (see FIG. 1).

Figure 6:
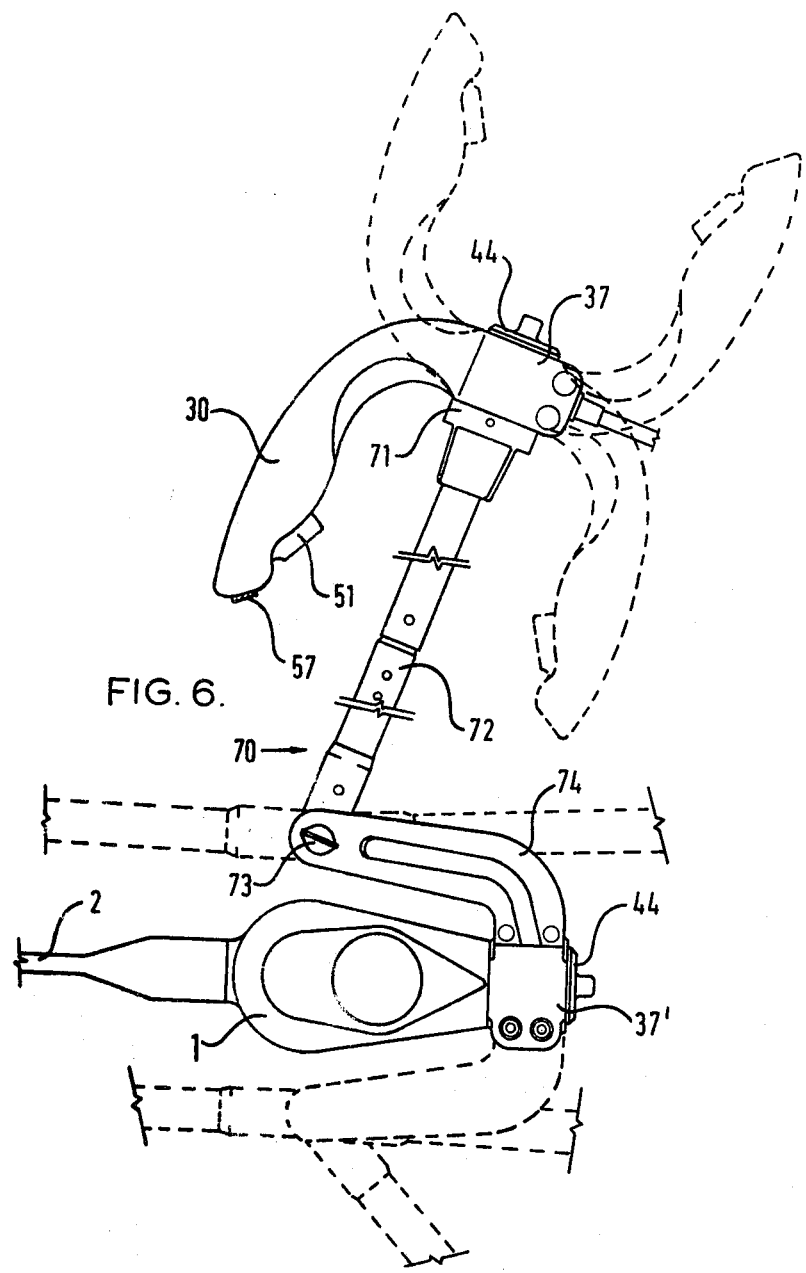
FIG. 6 is a schematic view of the handle and hedge trimmer with, interposed between them, an extension element in accordance with the invention.

FIG. 6 illustrates a support means in the form of an extension 70 which in the arrangement illustrated has been interposed between the housing 1 and a handle assembly 30. At one end the extension 70 has a body 37' similar to the body 37 of the handle and having a similar internal arrangement of bore and female terminals (not shown). At its other end the extension 70 has a transverse face 71 resembling the end of the housing 1 remote from the comb 2 and from which a similar spigot and terminal pins (not shown) extend. This end of the extension is thus adapted to receive a handle 30 which is secured thereto by a member 44, the handle 30 being connectable to the extension 70 in any of the four attitudes illustrated.

The extension comprises a stem 72 which is pivoted at 73 to a cranked arm 74 so that the position of the handle relative to the hedge trimmer is variable through a wide arc centered on the pivot 73, means (not shown) being provided for locking the stem 72 relative to the arm 74 in any chosen angular position. For favorable weight distribution the pivot 73 should be located inwardly of the housing 1 in either of the optional positions illustrated in full and dotted lines in FIG. 6 and for this reason it is preferable that the female terminals (not shown) in the body 37' of the extension should not open at the face of the body 37' engaged by the member 44 in FIG. 6 to prevent assembly of the extension in an axially reversed position relative to that shown. This is not essential, however, and extensions can be provided having four optionally selectable positions of assembly relative to the housing 1 in the same way as the handle 30.

The extension 70 illustrated in FIG. 6 is designed to extend the reach of the user of the hedge trimmer, e.g. when cutting a high hedge, or to enable the hedge trimmer to be used at a ground location without undue stooping. It will be evident that other extensions or mountings could be provided for other purposes and need not be adapted at the end remote from the housing 1 for reception of a handle 30.

If the support means of the invention is applied to an electrically operated tool other than a hedge trimmer, such as a drill, it may be desirable to adapt the end of the support remote from the tool for fixing relative e.g. to a work bench. In all applications, however, the invention provides a very quick and simple means for changing the position of a support relative to a tool.

We claim:

1. Support means for an electrically operated tool having terminal means, which support means includes a tool engaging body, means on said body whereby it may be detachably assembled with the tool in any chosen one of a plurality of different attitudes relative to the tool, and terminal means on said body arranged to form an electrical circuit for energizing the tool with said terminal means on the tool in each of said attitudes of the body, wherein the terminal means on said body includes terminal elements which extend through the body and are exposed therefrom at their opposite ends at opposite faces of the body, each of said terminal elements being adapted for electrical connection to a respective wire intermediate the exposed ends of the terminal elements.

2. Support means as claimed in claim 1 wherein the body is formed with a bore opening at both said faces thereof, the axis of the bore being parallel with the axes of the terminal elements so that the relationship of the bore to the terminal elements is the same at both said faces of the body.

3. Support means as claimed in claim 2, wherein the tool terminal means has terminal elements and the bore is adapted to receive a spigot on the tool which has the same relationship to the terminal elements of the tool as does the bore to the body terminal elements, the arrangement being such that either end of the bore can receive the spigot, electrical connection being made between the tool terminal elements and the ends of the body terminal elements which are nearer the tool.

4. Support means as claimed in claim 3, wherein the body is provided with terminal elements equal in number to those of the associated tool on each side of the bore, equidistant therefrom and arranged in the same plane containing the axis thereof, the arrangement being such that it is possible to connect the body to the tool, in either of its two mutually inverted positions in either of two positions rotated 180° relative to one another.

5. The assembly of an electrically operated tool and support means therefor, wherein the support means is formed on opposite sides thereof with similar connection means either of which may make a male-and-female releasable connection with connection means of the tool whereby the support means is releasably connectable to the tool in either of two mutually inverted positions, terminal means on the tool having a predetermined relationship to the connection means of the tool and terminal means on the support means extending therethrough to have the same relationship to the respective connection means of the support means on each of said opposite sides of the latter, said relationship corresponding to that of the tool terminal means to the tool connection means, the arrangement being such that the terminal means of the support means are engageable with the terminal means of the tool in either of said mutually inverted positions of the support means relative to the tool.

6. The assembly claimed in claim 5, wherein the number and the disposition of the terminal means relative to the connection means on both sides of the support means and on the tool is such that in either of its two mutually inverted positions the support means can be releasably connected to the tool in either of two positions rotated 180° relative to one another, the tool terminal means each engaging a different support terminal means as a result of the rotation, so as to form a circuit of reversed polarity.

7. Support means for an electrically operated tool having terminal means comprising, in combination, an elongated extension member having at one end a tool engaging body, means on said engaging body whereby it may be detachably assembled with the tool in any chosen one of a plurality of different attitudes relative to the tool, and terminal means on said engaging body arranged to form an electrical circuit for energizing the tool with said terminal means on the tool in each of said attitudes of the body, and a handle having at one end thereof a body similar to the tool engaging body, the extension member having at its other end means whereby it may be detachably assembled with the handle, and terminal means arranged to contact terminal means of the handle body when assembled therewith, the terminal means at opposite ends of the extension member being electrically interconnected so that the tool may be energized, when the extension member is assembled with the tool and the handle is assembled with the extension member, via an electrical circuit which includes contacted terminal means of the handle and extension member and of the extension member and tool.

8. Support means as claimed in claim 7, wherein the tool engaging body at one end of the extension member is pivotally connected thereto so that the angular attitude of said tool engaging body may be adjusted relative to the extension member.

* * * * *